United States Patent [19]

Kapuscinski et al.

[11] Patent Number: 4,816,172

[45] Date of Patent: Mar. 28, 1989

[54] CLEAR HIGH-PERFORMANCE MULTIFUNCTION VI IMPROVERS

[75] Inventors: Maria M. Kapuscinski, Carmel; Larry D. Grina, Hopewell Junction; Lee A. Brugger, Wallkill, all of N.Y.

[73] Assignee: Texaco Inc., White Plains, N.Y.

[21] Appl. No.: 122,314

[22] Filed: Nov. 18, 1987

[51] Int. Cl.$^4$ ................. C10M 149/10; C10M 151/02
[52] U.S. Cl. ...................................... 252/47; 252/47.5; 252/50; 252/51; 525/73
[58] Field of Search .......................... 252/50, 51, 47.5; 525/73

[56] References Cited

U.S. PATENT DOCUMENTS

| | | |
|---|---|---|
| 4,146,489 | 3/1979 | Stambaugh et al. ........... 252/51.5 R |
| 4,282,132 | 8/1981 | Benda et al. .................... 252/51.5 R |
| 4,292,185 | 9/1981 | Bollinger ............................. 252/47.5 |
| 4,693,838 | 9/1987 | Varma et al. ................. 252/51.5 R |
| 4,699,723 | 10/1987 | Kapuscinski et al. ................ 252/47 |

Primary Examiner—Jacqueline V. Howard
Attorney, Agent, or Firm—Robert A. Kulason; James J. O'Loughlin; Vincent A. Mallare

[57] ABSTRACT

This invention is a method of producing a clear, high-performance dispersant/antioxidant VII. The method comprising admixing a polar modifier to a VI improver during preparation process or to final product at a sufficiently high temperature to produce the desired clear, high performance VI improver.

19 Claims, No Drawings

CLEAR HIGH-PERFORMANCE MULTIFUNCTION VI IMPROVERS

FIELD OF THE INVENTION

This invention relates to hydrocarbons including hydrocarbon fuels and lubricating oils. More particularly, it relates to a method for improving the clarity and performance of lubricating oil additive, dispersant and antioxidant VI improver containing phenothiazine.

BACKGROUND OF THE INVENTION

As is well known to those skilled in the art, hydrocarbon fuels and lubricating oils are being formulated, as by addition of various additives, to improve their properties.

The dispersant and antioxidant viscosity index (VI) improvers can be prepared by free radically grafting of OCP polymer with dispersant monomer such as N-vinyl-pyrrolidone and antioxidant such as phenothiazine disclosed in corresponding U.S. application, Ser. No. 641,742.

Such VI improvers are often hazy. Addition of small amount of the polar materials, typically lubricant dispersants, polypropylene glycols, ester-type synthetic oils or plasticizers improve not only clarity but also the performance of the VI improves. It is, thus, an object of this invention to provide an additive system which permits attainment of improved hydrocarbons and lubricating oil VIIs which are clear and have high-performance. Other objects will be apparent to those skilled in the art.

SUMMARY OF THE INVENTION

This invention provides a method of producing a clear, high-performance dispersant/antioxidant VI improver. The method comprises addition of polar-modifiers to VI improvers as follows:

(a) during free radical grafting process, when phenothiazine is charged, (b) to the final product.

In this method, the polar modifiers are lubricant dispersants, polypropylene glycols ester-type synthetic oils or plasticizers. The polymer is an ethylene-propylene copolymer or an ethylene-propylene-diene terpolymer.

Also, in the process the dispersant may be N-vinylpyrrolidone (NVP) and the antioxidant is phenothiazine.

DESCRIPTION OF THE INVENTION

The base or core polymer which may be employed in practice of the process of this invention may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer

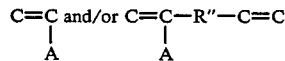

wherein A may be: hydrogen; hydrocarbon such as alkyl, aryl, etc.; phenyl; acetate or less preferred acyloxy (typified by —COOR); halide; etc. R" may be divalent hydrocarbon typified by alkylene, alkarylene, aralkylene, cycloalkylene, arylene, etc.

Illustrative of such monomers may be acrylates, methacrylates, vinyl halides (such as vinyl chloride), styrene, olefins such as propylene, butylene, etc., vinyl acetate; dienes such as butadiene, isoprene, hexadiene, ethylidene norbornene, etc. Homopolymers of olefins, (such as polypropylene, polybutylene, etc.), dienes, (such as hydrogenated polyisoprene), or copolymers of olefines with e.g., butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene.

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40-70 mole %, preferably 55-65 mole %, say 60 mole %, the remainder being derived from propylene.

The molecular weight $\overline{M}_n$ of the EPM copolymers which may be employed may be 10,000-1,000,000, preferably 20,000 200,000, say 140,000. The molecular weight distribution may be characterized by $\overline{M}_w/\overline{M}_n$ of less than about 15, preferably 1.2-10, say 1.8.

Illustrative EPM copolymers which may be employed in practice of the process of this invention may be those set forth in the following table, the first listed being preferred:

(a) The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_w/\overline{M}_n$ of 1.8.

(b) The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

(c) The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

When the base/core polymer is an ethylene-propylenediene terpolymer (EPT or EPDM), it may be formed by copolymerization of ethylene, propylene and diene monomers. The diene monomer is commonly typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 mole %, preferably 50-65 mole %, say 60 mole % and units derived from the propylene in amount of 20-60 mole %, preferably 30-50 mole %, say 38 mole % and units derived from third diene monomer in amount of 0.5-15 mole %, preferably 1-10 mole %, say 2 mole %. The molecular weight $\overline{M}_n$ of the terpolymers may typically be 10,000-1,000,000, preferably 20,000-200,000, say 120,000. Molecular weight distribution of the useful polymers is preferably narrow viz a $\overline{M}_w/\overline{M}_n$ of typically less than 15, preferably 1.5-10, say 2.2.

Illustrative EPT terpolymers which may be employed in practice of the process of this invention may be those set forth in the following table, the first listed being preferred:

TABLE (a) The Epsyn 3106 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index $\overline{M}_w/\overline{M}_n$ of 2.2.

(b) The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

(c) The Ortholeum 2052 brand of EPT marketed by DuPont containing 62 mole % of units derived from ethylene, 36 mole % of units derived from propylene, and 2 mole % of units derived from 1,4 hexadiene and having a $\overline{M}_n$ of 35,000 and a polydispersity $\overline{M}_w/\overline{M}_n$ of 2.

(d) The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

(e) The Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

The EPM and EPT polymers may contain minor portions (typically less than about 30%) of other units derived from other copolymerizable monomers.

It is a feature of the process of this invention that there may be grafted onto these oil-soluble, substantially linear carbon-carbon, backbone polymers, first graft units derived from a first graft dispersant monomer.

The functional dispersant monomer which may be grafted onto the EPM or EPT as the first graft monomer in practice of the process of this invention may be characterized by the formula RNR'R" wherein R is a hydrocarbon moiety possessing a polymerizable ethylenically unsaturated double bond. R may be an alkenyl or cycloalkenyl group (including such groups bearing inert substituents) typified by vinyl, allyl, C=C—C$_6$-H$_4$—, etc. R' may be hydrogen or a hydrocarbon including alkyl, alkaryl, aralkyl, cycloalkyl, and aryl. The moiety-NR'R", may include a heterocyclic ring (formed by joining R' and R") as in the preferred N-vinyl pyrrolidone; 1-vinyl imidazol; or 4-vinyl pyridine. R' and R" may be a hydrogen or a hydrocarbon moiety containing nitrogen, sulfur, or oxygen. Illustrative dispersant monomers which may be employed include those listed in the following table, the first listed, N-vinyl pyrrolidone, being preferred:

TABLE

N-vinylpyrrolidone
1-vinylimidazole
4-vinylpyridine
allyl amine

The first graft monomer may be a more complex reaction product formed by the reaction of an amine, typified by morpholine or N-methyl piperazine, and an epoxy compound typified by allyl glycidyl ether. It may be a monomer formed for example from the reaction of croton aldehyde and N-(3-aminopropyl) morpholine.

In practice of the process of this invention, 100 parts of charge EPM or EPT may be added to 100-1000 parts, say 300 parts of solvent. Typical solvent may be a hydrocarbon solvent such as hexane, heptane, tetrahydrofuran, or mineral oil. Preferred solvent may be a commercial hexane containing principally hexane isomers. Reaction mixture may then be heated to reaction conditions of 60° C.-180° C., preferably 150° C.-170° C., say 155° C. at 15-300 psig, preferably 180-220 psig, say 200 psig.

In the preferred two step process, there are admitted to the reaction mixture first graft monomer, typically N-vinylpyrrolidone in amount of 1-40 parts, say 5 parts, and a solution in hydrocarbon of free radical initiator. Typical free radical initiators may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2-10 parts, say 2 parts in 0.8-40 parts, say 16 parts of solvent.

The reaction is carried out at a temperature at least as high as the decomposition temperature of the initiator, typically 60° C. or higher.

Reaction is typically carried out at 60° C.-180° C., say 155° C. and 180-220 psig, say 200 psig during which time graft polymerization of the dispersant monomer onto the base EPM or EPT polymer occurs. The final product graft polymer may be typically characterized by the presence of the following typical units:

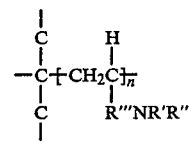

Typically there may be 0.1-80 say 6 amine units per 1000 carbon atoms in the polymer backbone. R''' is a saturated moiety derived from R.

It is a feature of the process of this invention that there may be bonded onto these oil-soluble, substantially linear, carbon-carbon, backbone polymers bearing units derived from a first graft monomer, units derived from a second (antioxidant) monomer containing at least one of sulfur, nitrogen, or oxygen in a heterocyclic ring. Although it may be possible to effect bonding and graft polymerization simultaneously, it is preferred to effect graft polymerization first and thereafter bonding.

The second monomer which may be employed may be monocyclic or polycyclic; and the nitrogen, sulfur, and oxygen may be contained in the same or a different ring. In the preferred embodiment, the second functional monomer may be polycyclic and the nitrogen and sulfur may be in the same heterocyclic ring. This monomer may contain both heterocyclic and aromatic rings as is the case with the preferred phenothiazine. The preferred compound is being phenothiazine and ring or/and N-substituted phenothiazine. Substituents may include hydrocarbon radicals selected from the group consisting of alkyl, alkenyl, cycloalkyl, aryl, alkaryl, or heterocyclic, including such radicals when containing oxygen, nitrogen, sulfur, halide or their combinations. Typically, the ring-substituted phenothiazine may include alkyl or alkenyl phenothiazines, alkoxy phenothiazine, hydroxy alkyl phenothiazines, amino phenothiazines, nitrophenothiazines, 3-formyl-10-alkyl-phenothiazine, 2-amino4-(2-phenothiazinyl) thiazole, alpha-(2-phenothiazinyl) thioacetomorpholide, etc. Typical N-substituted phenothiazine may include N-vinyl phenothiazine, N-acryl-amidomethyl phenothiazine, beta-(N-phenothiazinyl)-ethyl vinyl ether, beta-(N-phenothiazinyl)-ethyl methacrylates, reaction products of allyl glycidyl ether or glycidyl methacrylate with phenothiazine.

In practice of the process of this invention 100 parts of charge EPM or EPT (bearing units grafted thereon from the first graft monomers) may be added to 100–1000 parts, say 300 parts of diluent-solvent. Typical diluent-solvent may be a hydrocarbon solvent such as n-hexane, n-heptane, tetrahydrofuran, or mineral oil. Preferred solvent may be a commercial hexane containing principally hexane isomers. Reaction mixture may then be heated to reaction conditions of 60° C.–180° C., preferably 150° C.–170° C., say 155° C. at 15–300 psig, preferably 180–220 psig, say 200 psig.

Second monomer (antioxidant), typically phenothiazine is admitted in amount of 1–40 parts, say 4 parts, as a solution in 1–40 parts, say 16 parts of diluent-solvent-typically tetrahydrofuran (THF). This is followed by a solution in hydrocarbon of free radical initiator. Typical free radical initiators may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2–40 parts, say 2 parts in 0.8–40 parts, say 6 parts of solvent hexane.

The reaction is carried out at a temperature at least as high as the decomposition temperature of the initiator, typically 60° C. or higher.

Reaction is typically carried out at 60° C.–180° C., say 155° C. and 180–220 psig, say 200 psig during which time bonding of second monomer onto the base EPM or EPT polymer occurs. The final product graft polymer may be characterized by the presence of units derived from first and second monomers.

Typically there may be 0.1–60, say 3 units derived from second monomer per 1000 carbon atoms in the base/core polymer backbone.

For ease of handling, the polymerization solvent may be exchanged with a heavier solvent such as SUS 100 Oil. Product graft polymer is typically obtained as a solution of 4–20 parts, say 8.5 parts thereof in 80–96 parts, say 91.5 parts of solvent.

Although it is preferred to graft the first monomer onto the base polymer and to thereafter bond the second monomer onto the so formed graft polymer, it is possible to effect simultaneous reaction of first and second monomers.

The product so formed may be an oil-soluble, substantially linear, carbon-carbon backbone polymer of molecular weight $\overline{M}_n$ of 10,000–1,000,000, preferably 20,000–200,000, say 140,000, bearing thereon (per 1,000 carbon atoms in the polymer backbone) 0.1–80 units, preferably 1–15 units, say 6 units of first graft monomer and 0.1–60 units, preferably 1–12 units, say 3 units of second monomer.

It is a feature of this invention that the so-prepared polymers may find use in middle distillate fuel oils as dispersant when present in effective amount of 0.001–2 w %, say 0.5 w %. Typical fuel oils may include middle distillate fuel oils including kerosene, home heating oils, diesel fuel, etc.

Lubricating oils in which the dispersant viscosity index improvers of this invention may find use may include automotive, aircraft, marine, railway, etc., oils; oils used in spark ignition or compression ignition; summer or winter oils; etc. Typically the lubricating oils may be characterized by an ibp of 570° F.–660° F., say 610° F.; an ep of 750° F.–1200° F., say 1020° F; and an API gravity of 25–31, say 29.

The discussion above has been directed to producing a dispersant/antioxidant VI improver. According to the present invention improving, i.e. made clear and of higher performance, is made by the addition of small amounts of polar materials such as amines, amides, esters, ketones or glycols.

According to the present invention, the dispersant-/antioxidant olefin copolymer VI Improver is made by free radical grafting of N-vinylpyrrolidone as dispersant monomer and phenothiazine as antioxidant monomer with addition of polar modifiers. The present VI Improver is both clear and has superior engine tests performance as compared to a discussed-above dispersant/antioxidant copolymer viscosity improver index (DAOCP VI improver) which is often hazy. Addition of small amount of the polar materials, typically lubricant dispersants, polypropylene glycols, ester type synthetic oils or plasticizers improves not only clarity but also the performance of DAOCP VI improver.

The present invention comprises making DAOCP VI improver in a free radical grafting process using olefin copolymers as a polymer base, N-vinylpyrrolidone (NVP) and phenothiazine (PTZ) as grafting monomers and modifier (polar material) which decreases turbidity and improves engine test performance of the product.

The present DAOCP VII can be prepared in two-step or one-step processes. Modifier may be added during preparation process in a small amount or used as PTZ charging medium in larger amount. It can also be effective when added to the finished product, i.e., DAOCP VI Improver.

In the two-step method where the modifier is added during preparation, the polymer is added to the diluent-solvent in the reaction vessel or pressure reactor and heated to 80°–160° C. with stirring to form a homogenous solution. In the first step, NVP and a free radical initiator (typically dicumyl peroxide [DICUP]), are charged and the mixture is heated with stirring for a desired time. In the second step, PTZ and modifier (typically lubricant dispersant) as weak as DICUP are charged. Weight ratio of modifier to PTZ is in the range 0.02 to 0.5 (0.04 to 1.0 parts per 100 parts of polymer). The reaction time of each step is 5 to 120 minutes and, preferably, 10 to 60 minutes. The temperature in both steps is maintained at 150° C.–160° C.

In contrast, in the one-step process, a mixture of NVP, PTZ, modifier (typically lubricant dispersant) and DICUP or NVP with DICUP followed by PTZ with modifier are charged. The reaction temperature is as for two-step reaction and time is preferably 30 to 90 minutes. Weight ratio of modifier to PTZ is as described above.

In either the two-step or one-step process, a modifier (typically polypropylene glycol, ester-type synthetic oil or plasticizer) may be used as PTZ charging medium. Weight ratio of modifier to PTZ is in the range 20 to 0.5, preferably 10 to 1.

To the product, DAOCP VI Improver, prepared without modifier addition (two-step or one-step method), dispersant is added along with diluent oil or before the last stage of hexane evaporation (when product is prepared in hexane). Amount of modifier needed is in the range of 0.5 to 10 parts, preferably 1.0 to 3.0 per 100 parts of polymer.

In a process where a modifier is added to the finished product, a mixture of the finished product (DAOCP VI improver) and modifier, typically lubricant dispersant, is heated under nitrogen for 30 to 360 minutes, preferably 60 to 180 minutes, at 60° C. to 240° C., preferably at 140° C. to 200° C. Amount of modifier needed is in the range of 0.5 to 10 parts, preferably 1.0 to 3.0 parts per 100 parts of polymer.

The modifiers of the present method are mainly selected from lubricant dispersants, polypropylene glycols, esters and surface active agents.

Dispersants based on polyisobutylene succinimide, Mannich bases, amines, amino- amides, esters, amino-ester may be used as DAOCP modifiers.

Examples of dispersants which can be applied to this invention are listed below:

1. LUBRICANT DISPERSANTS:

(POLYISOBUTYLENE SUCCINIMIDE DISPERSANTS)

(a) Dispersant A based on polyisobutylene succinimide derivetized with pentaethylene- hexamine (PEHA-amine)
(b) Dispersant B based on polyisobutylene succinimide derivetized with tetraethylene pentamine (TEPA-amine)
(c) Dispersant C based on polyisobutylene succinimide derivetized with glycolated penthaethylenehexamine (PEHA-hydroxyamid)
(d) Dispersant D based on glycolated polyisobutylene succinimide derivetized with gycolated-tetraethylenepentamine (TEPA-hydroxyamid)

2. POLYPROPYLENE GLYCOLS

Molecular weights in the range of 200 to 2000. For example, Jeffox 400 (Texaco Chemical Company)

3. ESTERS (a) Synthetic oils
. di-2-ethylhexylate (Emolein 2958, made by Emery)
. diester adipate (Mobil DB-31)
(b) Plasticizers
. Diisononyl adipate (Jayflex DINA made by Exxon)
. Triisononyl trimellitate (Jayflex TINTM made by Exxon)

4. SURFACE ACTIVE AGENTS

Reaction products of ethylene oxide with nonylphenol (Surfonics made by Texaco Chemical Company)

The present product, in order to determine its effectiveness, has been evaluated by turbidity tests and engine test.

Turbidites of the experimental samples were measured by two instruments:

(a) Lumetron Colorimeter, Model 402E
(b) Hach Ratio Turbidimeter, Model 18900

In both methods, higher numbers indicate higher turbidities.

The samples were characterized as deposit protection agents as measured by the Single Cylinder CEC MWM-B Diesel Engine Test (DIN 51361 Parts I, II and IV). In this test, a sample of VI improver is blended into a fully formulated oil. Results are presented in "Merits", a higher merit evidencing better protection against deposit.

EXAMPLE 1

In this example a product is prepared in a two-step process. In the first step, a dispersant monomer N-vinylpyrrolidone (NVP) is grafted onto ethylene-propylene copolymer (EPM) (Mn-132,000 as measured by SEC) containing approximately 60 mol % of ethylene. 100 w. parts of EPM dissolved in 300 parts of hexane is heated to 155° C. (with stirring under nitrogen pressure of about 200 psig). 2.2 w.parts of NVP dissolved in 6.6 w.parts of hexane is added followed by 0.8 w.parts dicumyl peroxide dissolved in 2.4 w.parts of hexane. This mixture is stirred using above conditions for 20 minutes.

In the second step, 2.0 w.parts of phenothiazine (PTZ) dissolved in 8 w.parts of tetrahydrofuran (THF) is added, followed by 0.05 w.parts of dispersant A (PEHA-amine) and 1.1 w.parts of dicumyl peroxide dissolved in 3.3 w.parts of hexane. The mixture is stirred for 40 minutes using the conditions described above.

Then, the solvent hexane is exchanged with 1011 parts of solvent neutral oil (SNO-100) to give a solution containing 9 wt. % polymer. The hexane, from the mixture of the reaction product is removed by evaporation. Evaporation is done by raising temperature and vacuum gradually until no bulbing in the evaporated liquid is observed. At this point, evaporation is continued for 60 minutes at 155° C. under vacuum of 3-5 mmHg. The residue is used as is for further testing.

EXAMPLE 2

In example 2 the procedure of example 1 is followed except that dispersant is not charged.

EXAMPLE 3

In example 3 the procedure of example 2 is followed except that rubber cement B instead of rubber cement A and mineral oil SNO-148 as PTZ charging medium (instead of THF) are used.

EXAMPLE 4

In example 4 the procedure of example 3 is followed except that Jeffox 400 instead of SNO-148 is used as PTZ charging medium.

EXAMPLE 5

In example 5 the procedure of example 2 is followed except that during the last stage of evaporation, product is evaporated for 30 minutes at 155° C. and 30 minutes at 180° C.

EXAMPLE 6

In example 6 the procedure of example 5 is followed except that Dispersant A (1.7 g/100 g rubber) is added during the last stage of evaporation.

EXAMPLE 7

In example 7 the procedure of example 5 is followed except that a Dispersant B instead of Dispersant A is added.

EXAMPLE 8

In example 8 the procedure of example 6 is followed except that a Dispersant C instead of Dispersant A is added.

EXAMPLE 9

In example 9, the procedure of example 6 is followed except that a Dispersant D instead of Dispersant A is added.

EXAMPLE 10

In example 10 the procedure of example 5 is followed except that distillated water (1 g/100 g rubber) is added to the rubber cement.

EXAMPLE 11

In example 11 the procedure of example 10 is followed except that Dispersant A (1.7 g/100 g rubber) is added during the last stage of evaporation.

EXAMPLE 12

In example 12 the procedure of example 11 is followed except that a Dispersant C instead of Dispersant A is added.

EXAMPLE 13

In example 13 the procedure of example 11 is followed except that a Dispersant D instead of Dispersant A is added.

EXAMPLE 14

In example 14 the procedure of example 2 is followed except the rubber cement C instead of rubber cement A is added.

EXAMPLES 15-16

In example 15-16 the procedure of example 14 is followed except that 5.5 g or 110 g/100 g rubber of Dispersant D is added when the grafting reaction is complete, before stripping operation.

EXAMPLES 17-18

In example 17-18 the procedure of example 14 is followed except that Dispersant D is added to the finished product. The mixture of 100 parts of VI improver with 0.55 parts or 5.5 parts of Dispersant D were heated with stirring under nitrogen for 60 minutes at 150° C.

EXAMPLE 19

In example 19 the procedure of example 1 is followed except the cement C instead of cement A was used and the finished product was heated with purging of nitrogen for 2 hour at 80° C.

EXAMPLES 20-23

In examples 20-23 the procedure of example 17 is followed except that the mixture of 100 parts of VI improver with 0.33, 1.1, 4.4 and 5.5 parts of Dispersant D, respectively, was heated with purging of nitrogen for 2 hours at 80° C.

EXAMPLE 24

In example 24 a product is prepared in resin kettle under atmospheric pressure using extruded ethylene-propylenediene copolymer (EPDM) (Mn=70,000) and mineral oil SN-130 Shell is heated to 155° C. (with stirring under nitrogen blanket). In the first step, 4.0 w.parts of NVP is charged followed by 1.5 w.parts of dicumyl peroxide dissolved in 4.5 parts of SN-130. The mixture is stirred for 40 minutes under the above conditions.

In the second step, 3.3 w.parts of PTZ mixed with 25 w.parts of Jeffox 400 is added, followed by 1.9 w.parts of dicumyl peroxide dissolved in 6 w.parts of SN-130 oil. The mixture is stirred for 40 minutes using the conditions described above.

Then, enough neutral oil (SNO-100) is added to give a solution containing 9 wt. % polymer. The mixture is stirred for 60 minutes. The product is used as is for further testing.

EXAMPLE 25

In example 25 the procedure of example 24 is followed except that Emolein 2958 instead of Jeffox 400 as PTZ charging medium is used.

EXAMPLE 26

In example 26 the procedure of example 24 is followed except that Jayflex DINA instead of Jeffox 400 as PTZ charging medium is used.

EXAMPLE 27

In example 27 the procedure of example 24 is followed except that mineral oil, SN-130 Shell is used instead of Jeffox 400 as PTZ charging medium.

EXAMPLE 38

In example 28 the procedure of example 24 is followed except that PTZ is charged as a powder.

The results and evaluation data for the samples of examples 1-28 are listed in tables I-VI. The sample numbers are related to the example numbers.

As shown in table I, sample 1 prepared with the addition of Dispersant A during grafting reaction, is clearer than sample 2 prepared from the same rubber cement (A) without dispersant addition. The MWM-B diesel engine test performance of the sample 1 is better (Merits higher) than of sample 2. Samples 3 and 4, prepared from rubber cement (B) without dispersant addition but using various PTZ charging media showed different clarities and MWM-engine test performances. Sample 4 prepared using polar solvent, Jeffox 400, is clearer and performed significantly better in engine test than sample 3 prepared using non-polar mineral oil SN-148.

The results in Table I indicate that dispersant and/or polar solvent addition during preparation improve significant clarity and engine test performance of DAOCP.

TABLE 1

THE EFFECT OF DISPERSANT ADDITION DURING GRAFTING PROCESS ON PROPERTIES OF DAOCP VI IMPROVER

| SAMPLE | 1 | 2 | 3 | 4 |
|---|---|---|---|---|
| Materials (w. parts) | | | | |
| Rubber Cement (30 wt. % EPM in hexane) | 100 (A) | 100 (A) | 100 (B) | 100 (B) |
| N—vinylpyrrolidone (NVP) | 2.2 | 2.2 | 2.2 | 2.2 |

TABLE 1-continued

THE EFFECT OF DISPERSANT ADDITION DURING GRAFTING PROCESS ON PROPERTIES OF DAOCP VI IMPROVER

| SAMPLE | 1 | 2 | 3 | 4 |
|---|---|---|---|---|
| Phenothiazine | 2.0 | 2.0 | 2.0 | 2.0 |
| Dicumyl peroxide | 1.9 | 1.9 | 1.9 | 1.9 |
| Dispersant A (PEHA-amine) | 0.05 | — | — | — |
| PTZ charging medium | THF | THF | SN-148 | Jeffox 400 |
| LUMETRON TURBIDITY | 18 | 28 | 11 | 5 |
| HACH TURBIDITY | 137 | 189 | 146 | 62 |
| ENGINE TEST MWM-B ERITS | 70 | 64 | 58 | 69 |

In Tables II and III, the effect of various dispersants on clarity of DAOCP VI improver is shown. Samples 5 and 10, not treated with any dispersant, give higher Hach or Lumetron turbidities than samples 6-9 or 11-13 prepared with dispersant added during hexane evaporation. Among dispersants studied, Dispersant A is the best clarifier (sample 6).

As can be seen from the results in Table III, the addition of dispersants also improves stability of clarity during storage. After 4 months in storage, modified samples 11-13 showed lower Hach turbidities than unmodified sample 10.

TABLE II

TURBIDITY OF DAOCP VI IMPROVER vs DISPERSANT ADDITION

| SAMPLE | 5 | 6 | 7 | 8 | 9 |
|---|---|---|---|---|---|
| Dispersant (g/100 g rubber) | | | | | |
| A (PEHA-amine) | — | 1.7 | — | — | — |
| B (TEPA-amine) | — | — | 1.7 | — | — |
| C (PEHA-aminoacid) | — | — | — | 1.7 | — |
| D (TEPA-aminoacid) | — | — | — | — | 1.7 |
| LIMETRON TURBIDITY | 24 | 16 | 15 | 19 | 21 |
| HACK TURBIDITY | 183 | 102 | 112 | 114 | 136 |

TABLE III

TURBIDITY AND STORAGE STABILITY OF DAOCP VI IMPROVER vs DISPERSANT ADDITION

| SAMPLE | 10 | 11 | 12 | 13 |
|---|---|---|---|---|
| Dispersant (g/100 g rubber) | | | | |
| A | — | 1.7 | — | — |
| B | — | — | 1.7 | — |
| D | — | — | — | 1.7 |
| LUMETRON TURBIDITY | 31 | 19 | 18 | 22 |
| HACK TURBIDITY | | | | |
| initial | 148 | 67 | 76 | 75 |
| 8 weeks | 164 | 81 | 82 | 135 |
| 4 months | 176 | 92 | 132 | 167 |

The results in table IV illustrate that dispersants may be effective as a clarifiers when added to the product when the grafting reactions are completed (before evaporation) (samples 15 and 16) or after evaporation with heating under nitrogen for 30 minutes at 150 C (samples 17 and 18). Samples 15 and 18, treated with 5.5 g/100 g rubber of Dispersant D before evaporation or after evaporation respectively, showed lower Hach turbidity numbers (initial and in storage) than untreated sample 14. Increasing of the dispersant amount to 1.1 g/100 g rubber sample (16) does not further improve the clarity of product. A smaller amount of dispersant (0.55 g/100 g rubber) (sample 17) reduces the initial turbidity, but is not as effective as the higher amount (sample 18) in stabilizing clarity during storage.

When dispersant is added to the finished product rather than during the grafting or solvent exchange steps, its ability to act as clarifier depends upon heating conditions (samples 17-18 in Table IV and 21-13 in Table V). Sample 23 prepared by heating sample 14 at 80 C for 2 hours with 5.5 parts of Dispersant D, are clearer than the untreated sample, but hazier than sample 18 prepared by heating sample 14 with the same amount of dispersant at 150 C. for 1 hours.

TABLE IV

TURBIDITY OF DAOCP VI IMPROVER VS. DISPERSANT ADDITION DURING EVAPORATION OR TO THE FINISHED PRODUCT

| SAMPLE | 14 | 15 | 16 | 17 | 18 |
|---|---|---|---|---|---|
| Dispersant D (g/100 g rubber) | — | 5.5 | 11.0 | 0.55 | 5.5 |
| Lumetron Turbidity | 28 | 12.5 | 11.5 | 14 | 12 |
| Hach Turbidity | | | | | |
| initial | 183 | 82 | 81 | 77 | 53 |
| 4 weeks | 200 | 85 | 83 | 158 | 67 |

TABLE V

TURBIDITY OF DAOCP VI IMPROVER VS. DISPERSANT ADDITION TO THE FININSHED PRODUCT

| SAMPLE | 19 | 20 | 21 | 22 | 23 |
|---|---|---|---|---|---|
| Dispersant D (g/100 g rubber) | — | 0.33 | 1.1 | 4.4 | 5.5 |
| Lumetron Turbidity | 45 | 15 | — | 12 | 17.5 |
| Hach Turbidity | | | | | |
| initial | 200+ | 127 | 126 | 110 | 130 |
| 4 weeks | | 148 | 145 | 126 | 147 |

The results in table VI indicate that polar solvents added to the reaction mixture during DAOCP preparation in oil improved significantly clarity of the finished product. Samples 24-26 prepared using Jeffox 400, Emolein 2958 or Jayflex DINA as PTZ charging solvents are clearer (Lumetron and Hach numbers lower) than samples 27 or sample 28 prepared without polar solvent addition.

TABLE VI

| SAMPLE | 24 | 25 | 26 | 27 | 28 |
|---|---|---|---|---|---|
| PTZ charging medium | Jeffox 400 | Emolein 2958 | Jayflex DINA | SN-130 SHELL | none |
| TURBIDITY | | | | | |
| Lumetron | 13 | 13 | 14 | 23 | 24 |
| Hach | 86 | 150 | 111 | 200+ | 200+ |

We claim:

1. A method for making a clear, high-performing dispersant/antioxidant viscosity index improver comprising:
    (a) mixing about 1-40 parts of a dispersant monomer and about 0.2 to about 10 parts of a free-radical initiator with about 100 parts of a heated polymer solution and performing a grafting reaction of monomer onto polymer, said reaction being carried out at a temperature of about 50° C. to about 200° C. for a period of about 5 to about 120 minutes;
    (b) adding about 1-40 parts of an antioxidant monomer, about 0.2 to about 10 parts of a free radical initiator and about 0.5 to about 10 parts of a polar modifier to said reaction mixture to perform grafting reaction to produce a clear, high-performance dispersant/antioxidant viscosity index improver and recovering; and (c) recovering the dispersant/antioxidant viscosity index improver product.

2. A method of producing a clear, high performance dispersant/antioxidant viscosity index improver comprising:

(a) reaction 100 parts of a polymer base, 1–40 parts of a dispersant monomer, 1–40 parts of an anti-oxidant monomer in the presence of about 0.2 to about 10 parts of a free radical initiator and about 0.5 to about 10 parts of a prior modifier to provide a clear, high performance dispersant/antioxidant viscosity index improver, said reaction being carried out at a temperature of about 50° C. to about 200° C. for a period of about 5 to about 120 minutes; and (b) recovering the viscosity index improver product.

3. A method of making a clear, high-performance dispersant/anti-oxidant viscosity index improver comprising:

(a) heating a dispersant/anti-oxidant viscosity index improver with about 0.5 to about 10 parts of a polar modifier to produce a clear high-performance dispersant/anti-oxidant viscosity index improver product said reaction being carried out at a temperature of about 50° C. to about 200° C. for a period of about 5 to about 20 minutes; and (b) recovering said viscosity index improver product.

4. The method of claim 1, wherein said polymer is a copolymer of ethylene-propylene or a ethylene-propylene-diene terpolymer.

5. The method of claim 1, wherein said dispersant monomer is N-vinylpyrrolidone.

6. The method of claim 1, wherein said antioxidant monomer is phenothiazine.

7. The method of claim 1, wherein said free radical initiator is selected from the group consisting of dicumyl peroxide, di-t-butyl peroxide, benzoyl peroxide, diisopropyl peroxide and azobisisobutyronitrile.

8. The method of claim 7, wherein said free-radical indicator is dicumyl peroxide.

9. The method of claim 1, wherein said modifier is selected from the group consisting of lubricant dispersants, polypropylene glycols, ester-type synthetic oils and plasticizers.

10. The method of claim 1, wherein said polar modifier is selected from the group consisting of a lubricant dispersant based on polyisobutylene succinimide derivetized with pentaethylenehexamine, tetraethylene pentamine, glycolated pentaethylenehexamine, glycolated tetraethylenepentamine and polypropylene glycols.

11. The method of claim 1, wherein the process was carried out at a temperature of about 150° C. to about 165° C. for a period of about 5 to about 120 minutes.

12. The method of claim 1, wherein the weight ratio of the modifier to the anti-oxidant monomer is from about 0.02 to about 20.0.

13. The method of claim 1, wherein the modifier is present in the amount of about 0.04 to about 40.0 parts per 100 parts of polymer.

14. The method of claim 3, wherein the process was carried out at a temperature of about 50° C. to about 200° C. for a period of about 5 to about 120 minutes.

15. The method of claim 3, wherein said weight ratio to antioxidant is from about 20 to about 0.5.

16. The method of claim 1 wherein said dispersant monomer is selected from the group consisting of N-vinyl-pyrrolidone, 1-vinylimidazole, 4-vinylpyridine and allyl amine.

17. A method of producing a clear, high-performance dispersant/antioxidant viscosity index improver comprising admixing a polar modifier to a viscosity index improver which is based on a oil-soluble, substantially linear carbon-carbon backbone polymer grafted with a dispersant monomer and an antioxidant monomer containing at least one of sulfur, nitrogen or oxygen in a heterocyclic ring.

18. The method of claim 17 wherein said polar modifier is admixed with said polymer with N-vinyl pyrrolidone as a dispersant monomer and phenothiazine as an antioxidant monomer.

19. The method of claim 18 wherein said polar modifier is admixed to the heated final viscosity index improver product.

* * * * *